US011154012B2

(12) United States Patent
Mikkaelsson et al.

(10) Patent No.: US 11,154,012 B2
(45) Date of Patent: Oct. 26, 2021

(54) HAY TEDDING AND WINDROWING DEVICE (71) Applicant: ERE EHF., Kopavogur (IS)

(72) Inventors: Eirikur Mikkaelsson, Kopavogur (IS);
Eirikur R. Eiriksson, Gardabaer (IS);
Eythor R. Eiriksson, Kopavogur (IS)

(73) Assignee: ERE EHF., Kopavogur (IS)

( * ) Notice: Subject to any disclaimer, the term of this patent is extended or adjusted under 35 U.S.C. 154(b) by 252 days.

(21) Appl. No.: 16/314,533

(22) PCT Filed: Jun. 30, 2017

(86) PCT No.: PCT/IS2017/050011
§ 371 (c)(1),
(2) Date: Dec. 31, 2018

(87) PCT Pub. No.: WO2018/002959
PCT Pub. Date: Jan. 4, 2018

(65) Prior Publication Data
US 2019/0150363 A1 May 23, 2019

(51) Int. Cl.
*A01D 84/00* (2006.01)
(52) U.S. Cl.
CPC .................... *A01D 84/00* (2013.01)
(58) Field of Classification Search
CPC ................ A01D 84/00; A01D 80/00
See application file for complete search history.

(56) References Cited

U.S. PATENT DOCUMENTS

| 2,669,078 A | | 2/1954 | Gregory | |
|---|---|---|---|---|
| 3,059,403 A | * | 10/1962 | Bamford | A01D 78/02 56/366 |
| 4,208,863 A | | 6/1980 | Van Der Lely | |
| 4,807,429 A | * | 2/1989 | Roberts | A01D 65/08 56/192 |
| 4,858,419 A | * | 8/1989 | Bernier | A01D 57/28 56/189 |
| 5,272,860 A | * | 12/1993 | Baril | A01D 84/00 56/10.7 |
| 5,450,717 A | * | 9/1995 | Delperdang | A01D 57/20 56/366 |

(Continued)

FOREIGN PATENT DOCUMENTS

| DE | 1110458 B | 7/1961 |
|---|---|---|
| EP | 0354862 A1 | 2/1990 |

(Continued)

OTHER PUBLICATIONS

Iceland Search Report for corresponding Iceland Application Serial No. EU 050154, dated Jan. 17, 2017.

(Continued)

*Primary Examiner* — Abigail A Risic
(74) *Attorney, Agent, or Firm* — Tarolli, Sundheim, Covell & Tummino LLP (57) ABSTRACT

A device for tedding or turning crops, such as hay, can be used to facilitate a faster drying of the hay uses a fan wheel to blow the hay off the ground and toss the hay simultaneously. A device for windrowing hay before the hay is harvested by harvesting machines can also be used with the device for tending or turning crops.

21 Claims, 7 Drawing Sheets

(56) References Cited

U.S. PATENT DOCUMENTS

| | | | | |
|---|---|---|---|---|
| 2007/0144130 A1* | 6/2007 | Geiser | ............... | A01D 80/00 |
| | | | | 56/14.9 |
| 2011/0220748 A1* | 9/2011 | Bennett | ............ | A01F 29/005 |
| | | | | 241/30 |
| 2017/0071132 A1* | 3/2017 | Dunn | ................ | A01D 84/00 |
| 2017/0280627 A1* | 10/2017 | Treffer | ............... | A01D 82/02 |

FOREIGN PATENT DOCUMENTS

| | | |
|---|---|---|
| FR | 2437771 A1 | 4/1980 |
| FR | 2572882 A1 | 5/1986 |
| WO | 8500088 A1 | 1/1985 |

OTHER PUBLICATIONS

PCT International Search Report and Written Opinion for corresponding International Application Serial No. PCT/IS2017/050011, dated Nov. 10, 2017.

\* cited by examiner

HAY TEDDING AND WINDROWING DEVICE

RELATED APPLICATIONS

The present application is a U.S. National Stage application under 35 USC 371 of PCT Application Serial No. PCT/IS2017/050011, filed on 30 Jun. 2017; which claims priority from IS Patent Application No. 050154, filed 1 Jul. 2016, the entirety of both of which are incorporated herein by reference.

FIELD OF THE INVENTION

The invention relates to a device for tedding or turning crops, such as hay, to facilitate a faster drying of the hay. Furthermore, the invention relates to a device for windrowing hay before it is harvested by harvesting machines.

INTRODUCTION

Traditional machines for tedding and windrowing hay after cutting and before harvesting rely on machinery having rotating portions with rake tines for tedding or windrowing the hay. Rotating circular structures with a multitude of outwardly extending rake tines are rotated by means of power take-off shaft (PTO shaft) driven by a tractive vehicle. The rake tines operate such that they pull stalk material such as hay from the ground, either for the purpose of fluffing or windrowing the stalk material.

One of the disadvantages of these traditional devices is that the tines hit the ground frequently due to bumps or uneven surface of the field, which results in damaging of the hay field or corn field and exposes the soil to foreign plant life as well as routing up dirt which blends with the crops. This can result in the bending or breaking of the rake tines damaging the device and leaving broken tines distributed in the field and in the hay. This can further damage hay harvesting devices during collection causing further damage in costs for farmers. Another disadvantage is that when the tines repeatedly hit the stalk material it damages or reduces the quality of the stalk material during both fluffing and windrowing.

Devices with blowing functions have been used in the farming industry to harvesting stalk material, in order to provide touch-free solutions have been designed. DE1110458 discloses a hay blowing device being pulled on wheels by a tractive vehicle. The hey blowing device has a vertical tube chamber with a fan wheel and a downward facing air outlet, which extends distally into a short but elongated portion below and behind the vertical tube chamber. The air outlet has a flap which can be used to regulate the speed of air blown out of the device. WO 85/00088 discloses an apparatus for swathing, having, turning and spreading fodder without contacting any mechanical part with the ground and the fodder. The apparatus has a frame on wheels and an air nozzle with a triangular or similar shape blowing in a vertical and opposite direction of the moving direction of the device for dividing the fodder into two portions from the center towards the outside to turn the fodder over and align it.

SUMMARY

The problem with prior art devices, which aim to provide touch-free solutions in tedding hey, is that they do not have an effective design in blowing the hey off the ground and fluffing it The present invention provides a new device and method for tedding and windrowing hay without using mechanical means for physically scraping the ground in order to toss or rake the hay on the ground. The present invention provides a device and method where a fan wheel blows air through slits or nozzles on the air outfeed portion of the device under an angle to toss or windrow the hay. The device of the present invention uses a housing with a fan wheel and chambers with air slits to blow air downwards towards the newly cut crops on the ground at a certain angle to ted and or windrow the hay or crops. The device has spoiler panels in the chambers to evenly direct the flow along the length of the device and downwards to the slit. In order to toss or tedd hey on the ground it is important to note that some portions of it are more wet than others and the straws are orientated in all directions. Prior art devices only provide linear outfeed which does not work for hey conditions mentioned above. Furthermore, prior art devices are not suitable for scaling up and covering wider area as the tractive vehicle is driven through the field. In some embodiments of the present invention, the following features may be employed to overcome the problems with prior art devices: a) providing a solution where the wind blowing device is not operated on wheels and therefore only follows the stable movements of the tractive vehicle, b) the air is blown through a slit under an angle which facilitates lifting and turning of the hey at the same time, c) using spoilers to distribute the hair from the fan wheel along the length of the device to cover wider area of the filed, d) use of spoiler devices around the air outlet slit to regulate and control the air blown out of the device to better facilitate the tossing and the turning of the hey or stalk material.

It is an object of the present invention to overcome or ameliorate the aforementioned drawbacks of the prior art and to provide an improved and/or alternative and/or additional method or device for tedding and windrowing hay. It is one preferred object of the present invention to provide a device with a simple and robust design in order to further improve the failsafe operation. Moreover, it is a preferred object of the present invention to provide an efficient design to eliminate physically touching the crops on the ground with tines or other mechanically driven physical means to preserve and provide better quality crops as the constant hitting of the hay with tines will reduce the quality of the crops. Furthermore, it is a preferred object of the present invention to provide an efficient design for tedding and windrowing hay by providing a device which uses a housing with a fan wheel and elongated air slit outlets with spoiler devices to control the air blown out of the device.

The object(s) underlying the present invention is (are) particularly solved by the features defined in the independent claims. The dependent claims relate to preferred embodiments of the present invention. Further additional and/or alternative aspects are discussed below.

The present invention provides a hay tedding and windrowing device for connecting to and operating with a tractive vehicle. The device comprises a drive means, a housing having a) a central wheel compartment with an air intake portion, and b) one or more air outfeed means. The device further comprises one or more fan wheels within the central wheel compartment, connected to the drive means. The air outfeed means comprises an elongated portion extending distally from the central wheel compartment, having one or more elongated downward facing air outlet slit extending along the chamber.

In an embodiment of the present invention the one or more air outfeed means comprise at least one oppositely arranged outfeed compartment further comprising an elongated chamber having one or more elongated downward facing air outlet slits extending along the chamber.

In an embodiment of the present invention the one or more elongated downward facing air outlet slits comprise a continuous slit extending along the length of the elongated outfeed compartments and the central outfeed compartment.

In an embodiment of the present invention the device comprises one fan wheel in a central position in the central wheel compartment of the device.

In an embodiment of the present invention one or more spoiler panels are arranged inside the air outfeed means 6-7 to distribute airflow along the length of the elongated outfeed compartments 6 and the central outfeed compartment 7. Spoilers are used to divert the airflow from the fan wheel in both directions of a device having two oppositely arranged air outfeed compartments.

In an embodiment of the present invention the device comprises two or more fan wheels arranged in the central wheel compartment of the device. In such an embodiment separate wheels can be used to direct airflow from the central wheel compartment in each direction of a device having two oppositely arranged air outfeed compartments.

In an embodiment of the present invention the fan wheel comprises fan blades.

In an embodiment of the present invention the one or more elongated downward facing air outlet slits is separated into multiple slits by one or more separation panels.

In an embodiment of the present invention the one or more elongated downward facing air outlet slits further comprises one or more adjustable spoiler panels on hinges in the bottom or lower or after part of the slit.

In an embodiment of the present invention the one or more elongated downward facing air outlet slits further comprises one or more air direction controllers. The one or more air direction controllers can be positioned in the in the bottom part of the slit or on the adjustable spoiler panel.

In an embodiment of the present invention the device further comprises a chassis for carrying the housing and fan wheel, the chassis comprising connector beams for connecting to an attaching means of a tractive vehicle.

In an embodiment of the present invention the device further comprises one or more spoiler panel arranged inside the elongated portion of the outfeed means to distribute airflow.

In an embodiment of the present invention the drive means comprises an input shaft connectable to a power take-off shaft, which is connected to an output shaft of a tractive vehicle.

In an embodiment of the present invention the drive means further comprise a belt drive connecting the input shaft to the fan wheel.

In an embodiment of the present invention the fan wheel and drive are configured to be capable of creating an airflow through the device from 5-30 m$^3$ per second, when operated with a belt drive system to gear up the rotation of the fan wheel with the rotation of the power take-off (PTO) shaft. In a specific embodiment of the present invention, rotation of the fan wheel of 2700 revolutions per minute will result in an airflow of around 29 m$^3$ per second.

In an embodiment of the present invention the elongated outfeed means and air outlets are arranged to blow air at an angle within the range from about 0 to 45° from vertical, such as from about 10° to about 40°, or such as from about 15° to about 30° from vertical.

In an embodiment of the present invention the elongated outfeed portion of the outfeed means extend substantially in a sideways direction from the central wheel compartment relative to the forward operating direction of the device and connected tractive vehicle.

In an embodiment of the present invention the elongated outfeed means extend substantially in a sideways direction at an angle in the range from about 45° to about 90° relative to the forward operating direction of the device and connected tractive vehicle. Preferably the elongated outfeed means extend substantially in a sideways direction at an angle of about 85° to about 95°, such as 90°, relative to the forward operating direction of the device and connected tractive vehicle.

In an embodiment of the present invention the drive means comprises an input shaft connectable to a power take-off shaft connected to an output shaft of a tractive vehicle. The input shaft in the device is connected to drive means such as belt drive system, which is then connected to the fan wheel to power the rotation of the fan wheel.

In an embodiment of the present invention the elongated means are arranged with hinges and mechanic actuators such as hydraulic cylinders or pneumatic cylinders, so that they can be raised from an operating position to a raised transport position, relative to the central wheel housing.

In an embodiment of the present invention the operation width of the device is within the range from about 5 m to about 20 m.

The present invention further provides a hay tedding and windrowing device for connecting to and operating with a tractive vehicle, where the device comprises a) a drive means, b) a housing, having; i) an air intake, ii) a central wheel compartment, and iii) one or more air outfeed compartments. The device further comprises a fan wheel within the central wheel compartment, connected to the drive means.

The air outfeed compartment comprise a central outfeed compartment and two elongated and oppositely arranged elongated outfeed compartments extending distally from the central wheel compartment and the central outfeed compartment, and wherein the central outfeed compartment and the distally extending elongated outfeed compartments further comprise one or more elongated downward facing air outlet slits.

The present invention also provides method for tedding hay, the method comprising the steps of:
connecting to a tractive vehicle the hay tedding and windrowing device of the present invention, by connecting the chassis of the device to the attaching means of the tractive vehicle, and connecting drive means of the hay tedding and windrowing device to a power take-off shaft of the tractive vehicle,
driving the tractive vehicle through cut grass and/or hay and outputting power to the power take-off shaft for turning the fan wheel in the device, such that air is sucked into the housing of the device and directed into elongated chambers and blown out through downward facing air outlet slits, wherein the hay is tedded.

In an embodiment of the present invention the method for windrowing hay comprises the steps of:
connecting the hay tedding and windrowing device of the present invention, by connecting the chassis of the device to attaching means of the tractive vehicle, and connecting drive means of the hay tedding and windrowing device of the present invention to a power take-off shaft of the tractive vehicle,
extending one or more of the connector beams of the device so that an outfeed compartment with an elongated chamber extends in a diagonal position with respect to the operating direction of the tractive vehicle at an angle within the range from about 25° to about 65° with respect to the forward driving direction of the tractive vehicle, driving the tractive vehicle through a field with cut grass and/or hay and outputting power to the power take-off shaft for turning the fan wheel in the device, such that air is sucked into the housing of the device and directed into the sideways arranged elongated chambers and blown out through one or more downward facing air outlet slit, resulting in that the hay is arranged in a windrow.

In an embodiment of the present invention the hay tedding and windrowing device of the invention can be attached to an attaching means to a tractive vehicle and powered by connection to a splined output shaft of a tractive vehicle through a PTO unit both at the front and the aft end of the tractive vehicle.

In an embodiment of the present invention the hay tedding and windrowing device comprises two oppositely arranged outfeed compartment each comprising a respective elongated chamber.

In an embodiment of the present invention the hay tedding and windrowing device functions as either hay tedding/ fluffing device or windrowing device based on how it is operated. By attaching the device to the aft portion of a tractive vehicle and directing the air outfeed portion of the device downwards and substantially perpendicular to the operating direction of the tractive vehicle, a wide area is covered in tedding/fluffing the hay. By attaching the device to the aft or front portion of a tractive vehicle and directing the air outfeed portion of the device downwards and in a diagonal direction to the operating direction of the tractive vehicle the device can be used to windrow the hay.

In an embodiment of the present invention the hay tedding and windrowing device further comprises a blocking means attached to the chassis to prevent the hay to be blown longer than a determined distance from the device during operation.

In an embodiment of the present invention the hay tedding and windrowing device comprises a single elongated outfeed means extend substantially in a sideways or perpendicular direction from the operating direction of the tractive vehicle.

The above features along with additional details of the invention, are described further in the examples below, which are intended to further illustrate the invention but are not intended to limit its scope in any way.

In the present context the term "attaching means" refers to attaching or linking devices on tractive vehicles such as three-point hitch, three point linkage devices or any other linkage systems used to attach agricultural implements to tractors.

In the present context the term "tractive vehicle" refers to vehicles such as industrial or agricultural tractors for operating agricultural devices including mowers, harvesters, hay tedding and windrowing devices etc.

In the present context the term "drive means" refers to a set of components that use the power from a tractive vehicle to drive the fan wheel of the device of the present invention. The drive means may comprise an input shaft of the device which is connected to the fan wheel. The input shaft is connectable to a power take-off shaft connected to an output shaft of a tractive vehicle. The input shaft in the device is connected to drive means such as belt drive system, which is then connected to the fan wheel to power the rotation of the fan wheel. A normal rotation of a PTO shaft from a tractive vehicle is between 500 and 1200 rpm. A belt drive system is then used to gear up the rotation of the fan wheel with the rotation of the power take-off (PTO) shaft, based on what rotation or output is desired.

In the present context the term "hay" refers to any stalk plant material which is harvested as crops for food, clothing, livestock fodder, biofuel, medicine or other uses.

The term "fan wheel" as used herein is intended to encompass any suitable wheels for high volume air delivery and include both conventional fan wheels, blower wheels or impeller wheels such as but not limited to Shrouded Radial Blade wheel, Backward Inclined blower wheel, Backward Curved blower wheel, and airfoil blower wheel:

A fan wheel used in the invention can be a propeller type fan wheel with suitable fan blades, such as but not limited to a fan blade with 6, 8 or 10 fan blades of suitable shape and pitch angle.

The terms "tedding", "fluffing" and "tossing" refers to lifting the crops on the ground up by blowing air under a certain angle to lift it off the ground and separating the straws in the crop to facilitate faster drying.

The term "windrowing" is used herein to define the arrangement of hay or any crop in a long ridge or row for harvesting using agricultural harvesting devices.

BRIEF DESCRIPTION OF THE DRAWINGS

The skilled person will understand that the drawings, described below, are for illustration purposes only. The drawings are not intended to limit the scope of the present teachings in any way.

DESCRIPTION OF VARIOUS EMBODIMENTS

In the following, exemplary embodiments of the invention will be described, referring to the figures. These examples are provided to provide further understanding of the invention, without limiting its scope.

Figure 1:
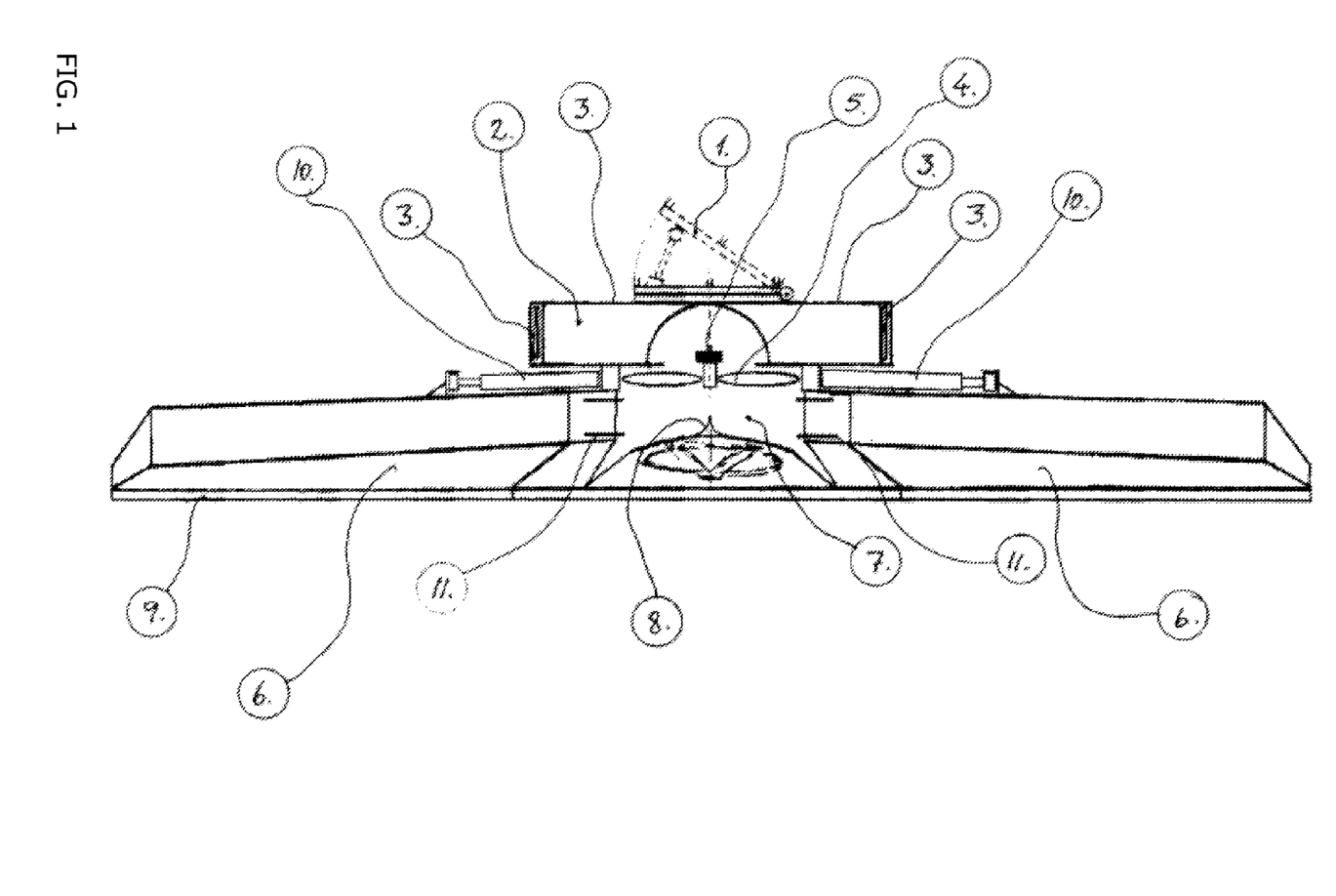
FIG. 1 shows a schematic drawing of a top view of an embodiment of the hay tedding and windrowing device of the present invention.

FIG. 1 shows a top view of an embodiment of the hay tedding and windrowing device. The device is connected to a tractive vehicle by connector beams 1 for connecting to an attaching means of the tractive vehicle (not shown). The connector beams 1 are designed to be attachable to the attaching means of tractive vehicles and can be adjusted to position the hay tedding and windrowing device in a diagonal position to operate near fences or ditches/canals. The hay tedding and windrowing device comprises a housing having a central wheel compartment 2, an air intake portion 3 and a fan wheel 4. The device further comprises drive means and one or more air outfeed compartments 6-7. 5 The drive means is positioned in the air intake portion 3 of the housing and the fan wheel 4 is positioned within the central wheel compartment 2 between the air intake portion 3 and the one or more air outfeed compartments 6-7 of the housing. The fan wheel 4 is driven by drive means 5 such as belt drive system which allows for high rotation of the fan wheel. The central wheel compartment houses the fan wheel 4 and upon rotation it takes air from the adjacent an air intake portion 3 and blows the air out with high velocity through the one or more air outfeed compartments 6-7. In the embodiment shown in FIG. 1 there are two oppositely arranged outfeed compartments 6 extending distally from a central outfeed compartment 7 behind the central wheel compartment 2. Two spoiler panels 8, shown in are shown in the central outfeed compartment 7, each panel having a curved cross section extending in a soft curvature from the upper portion of the central outfeed compartment 7 towards the lower portion of the beginning of the oppositely arranged distally extending outfeed compartments 6. The drawing further shows how the elongated 6 are arranged with hydraulic cylinders 10 and hinges 11, so that they can be lifted from an operating position to a raised transport position, relative to the central outfeed compartment.

Figure 2:
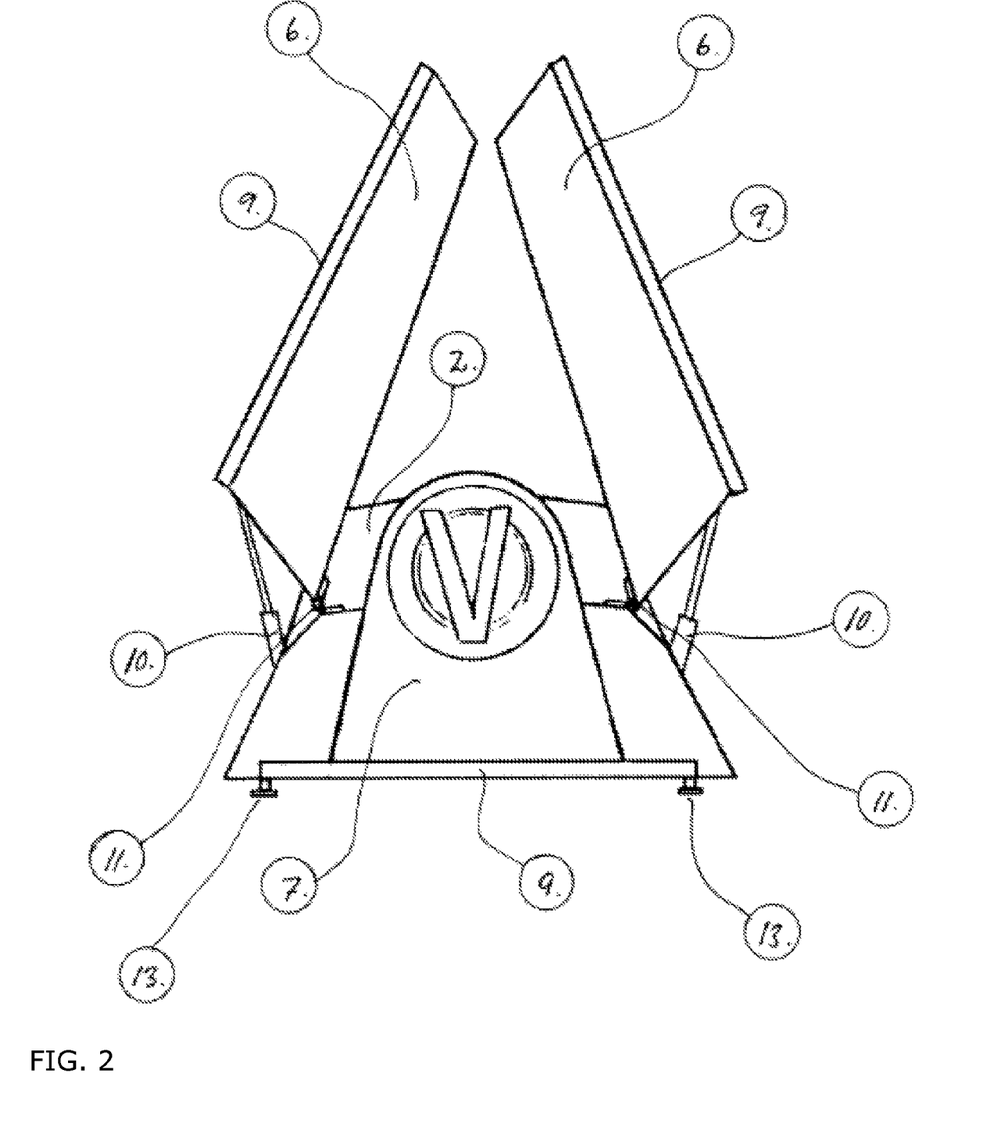
FIG. 2 shows a schematic drawing of a rear view of the embodiment of the hay tedding and windrowing device in FIG. 1 in a transporting position.

FIG. 2 shows a rear view of the same embodiment of the hay tedding and windrowing device as in FIG. 1. The central outfeed compartment 7 behind the central wheel compartment 2 with downward facing air outlet slits 9 extending along compartment. The two oppositely arranged outfeed compartments 6 are shown in a raised transport position from an operating position, where the hydraulic cylinders 10 have been used to raise the oppositely arranged outfeed compartments 6 about the hinges 11.

Figure 3:
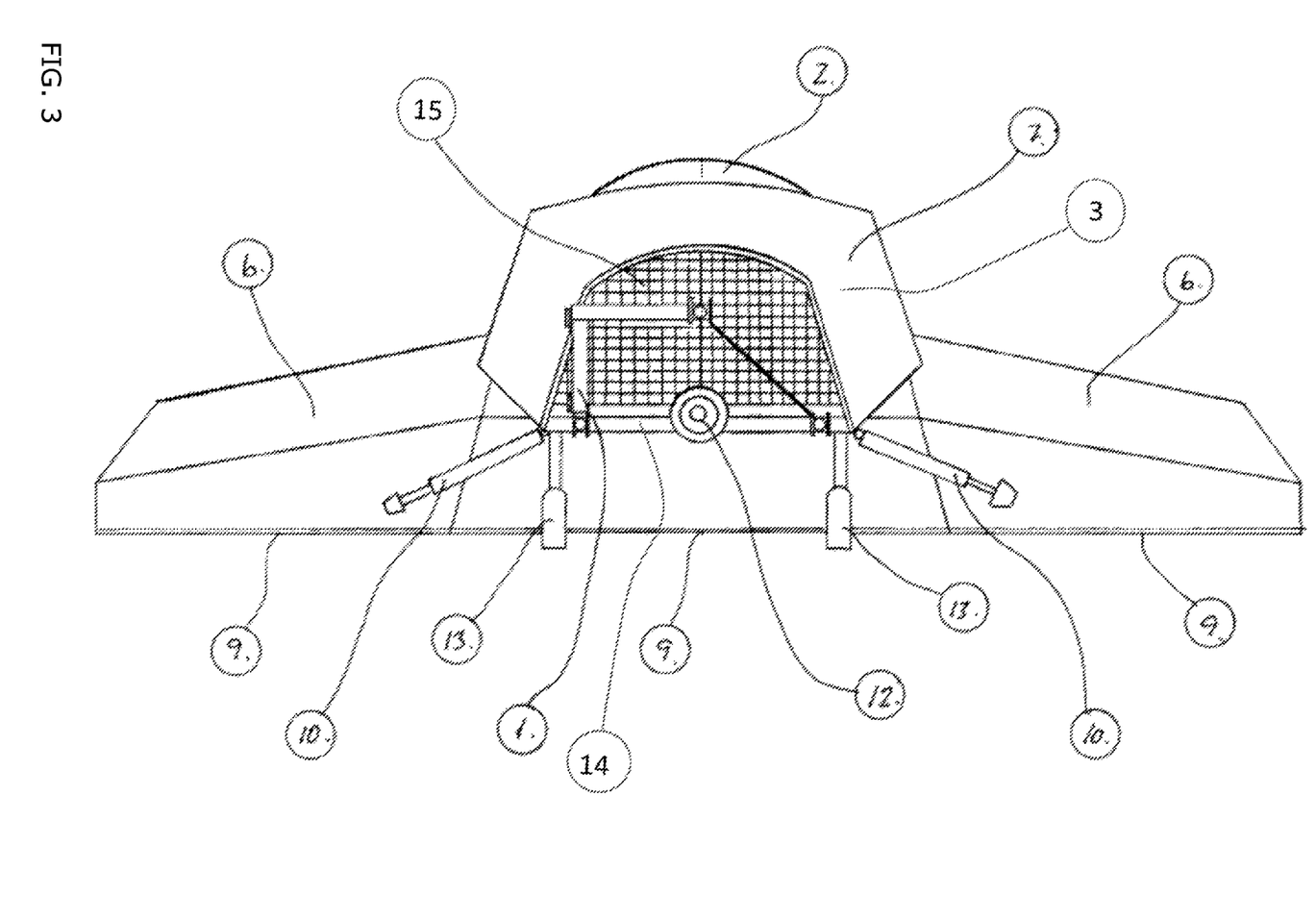
FIG. 3 shows a schematic drawing of a front view of the embodiment of the hay tedding and windrowing device in FIG. 1.

FIG. 3 shows a front view of the same embodiment of the hay tedding and windrowing device as in FIG. 1. The connector beams 1 are shown as connector beams attached to the chassis 14 of the hay tedding and windrowing device. The air intake portion 3 is shown with a grid or vent panel 15 to increase air intake and to prevent accidents. The drawing also shows feet or ski-like devices 13 for the device to rest on during storage.

Figure 4:
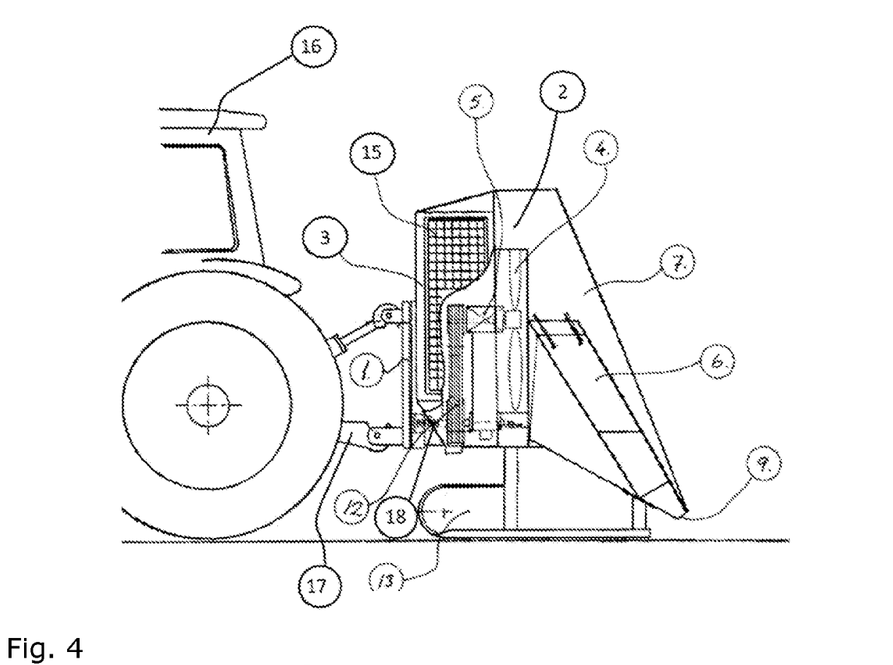
FIG. 4 shows a schematic drawing of a side view of the embodiment of the hay tedding and windrowing device in FIG. 1.

FIG. 4 shows a side view of the hay tedding and windrowing device connected to a tractor. The device is connected to a tractive vehicle by connector beams 1 for connecting to a attaching means of the tractive vehicle 16. The connector beams 1 are designed to be attachable to attaching means, such as a three point linkage devices 17 of the tractive vehicle 16. The housing of the hay tedding and windrowing device is shown in this drawing having a central wheel compartment 2, an air intake portion 3 having a grid or vent panel 15 and an outfeed compartment 6 extending distally from a central outfeed compartment 7. The fan wheel 4 is shown in the central wheel compartment 2 between the air intake portion 3 and the central outfeed compartment 7. The fan wheel 4 is connected to the as belt drive system 12, which is connected to an input shaft 18 connectable to a power take-off shaft of the tractive vehicle (not shown). The drawing also outlines better the feet or ski-devices 13 for the device to rest on during storage.

Figure 5:
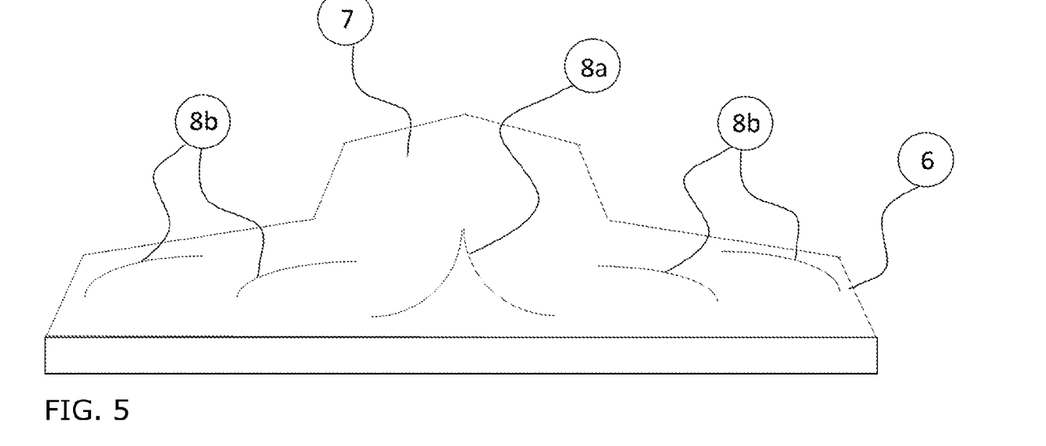
FIG. 5 is a schematic drawing outlining spoiler panels in the outfeed compartments of the device.

FIG. 5 shows spoiler panels 8 in the outfeed compartments 6 and 7. The spoiler panels 8 are arranged inside the chambers to distribute evenly the airflow from the fan towards elongated downward facing air outlet slits 9 extending along the downwards facing side of the outfeed compartments 6 and 7. The spoiler panels 8 shown in FIG. 5 are of two types. First there are two oppositely arranged panels 8a having a curved cross section extending in a soft curvature from the upper portion of the central outfeed compartment 7 towards the lower portion of the beginning of the oppositely arranged distally extending outfeed compartments 6. Then there are four oppositely arranged panels 8b (two in each distally extending outfeed compartment 6) having a curved cross section extending in a soft curvature along the length of the each distally extending outfeed compartment 6 and downwards towards the downward facing air outlet slit 9.

Figure 6A:
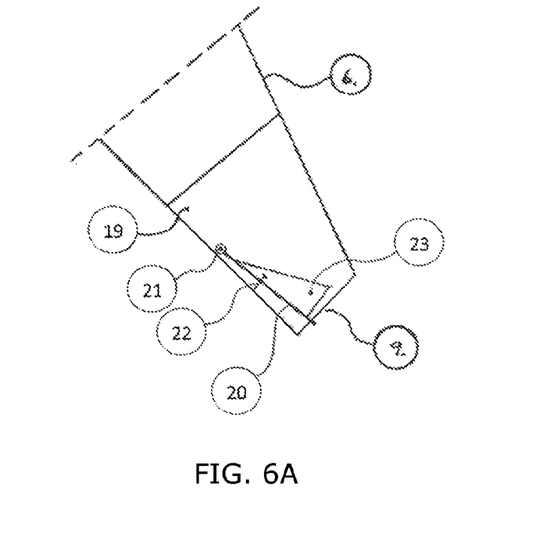
FIG. 6 shows a cross section (A) and top view (B) of different embodiments for directing and controlling the air outfeed in the outfeed compartment of the device.
Figure 6B:
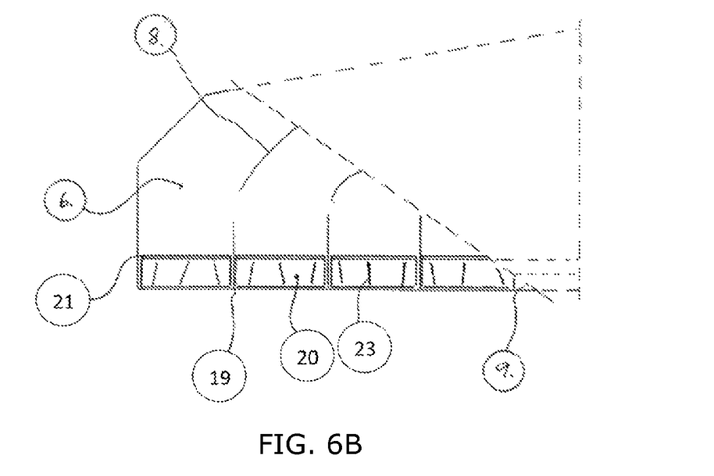
Figure 6C:
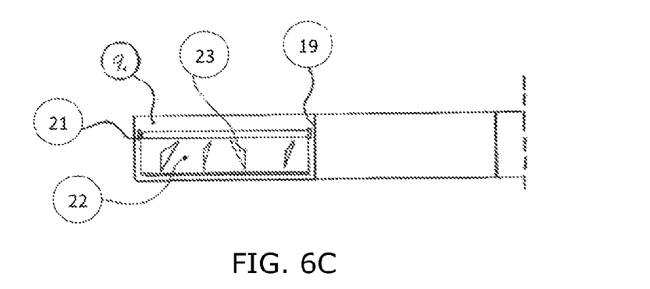

FIG. 6 shows different embodiments for directing and controlling the air outfeed in the outfeed compartment 6 and 7. FIG. 6A is a cross section drawing of the distally extending outfeed compartment 6, showing several embodiments for controlling the outfeed properties of the device of the invention. First there is a separation panel 19 for separating the downward facing air outlet slit 9 into multiple slits. The drawing also shows an adjustable spoiler panel 20 on hinges 21 in the bottom or lower or after part of the slit 9. These adjustable spoiler panels 20 can be raised and lowered using an adjusting bolt or pin 22 and thereby increasing or decreasing the circumference of the slit 9 as well as changing the angle of attack of the air from the slit 9. Another embodiment shown in the drawing is an air direction controller 23 positioned on the adjustable spoiler panel 20 for directing the airflow through the slit downwards at different angles. FIG. 6B shows a schematic drawing of one distally extending outfeed compartment 6, where the upper panel has been partially removed, revealing spoilers 8 and other means for controlling the outfeed properties of the device of the invention. The drawing provides a top view of the separation panels 19 for separating the air outlet slit 9 in to multiple slits an adjustable spoiler and the adjustable spoiler panels 20 on hinges 21 with a plurality of air direction controllers 23 directed in different directions on the adjustable spoiler panel 20. FIG. 6C shows how the air direction controllers 23 on the adjustable spoiler panels 20 on hinges 21 are triangular in shape and their different directions.

Figure 7A:
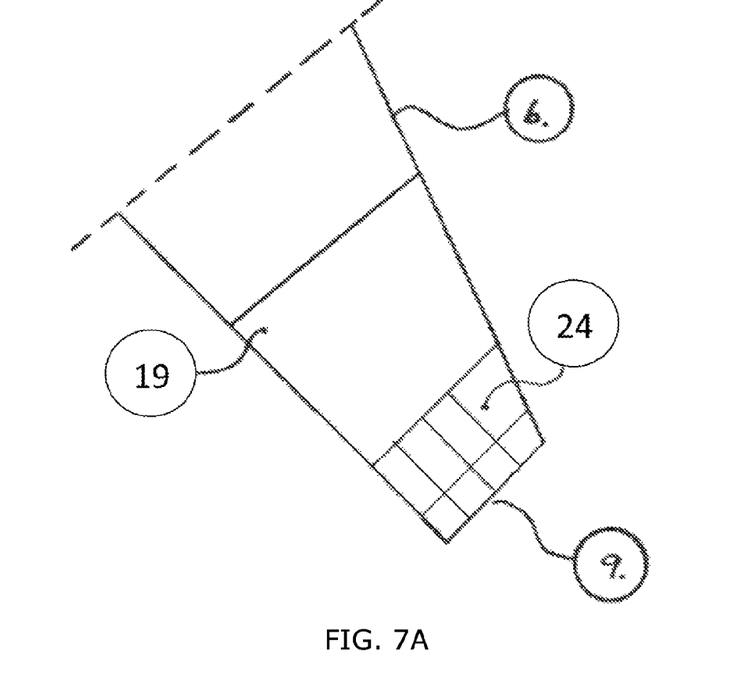
FIG. 7 shows a cross section (A) and underneath (B) air outfeed slit of one embodiment of the invention.
Figure 7B:
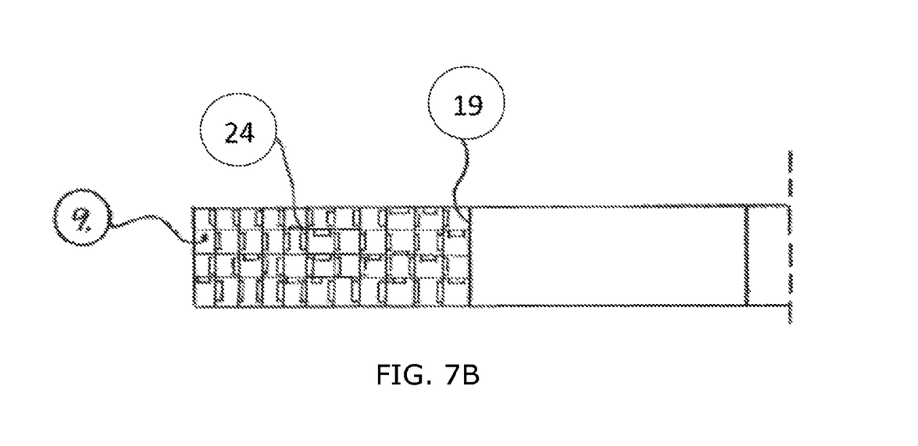

FIG. 7 shows a different embodiment of controlling the air outfeed through the slit 9. A grid 24 is placed in the outfeed portion of the slit 9. FIG. 7A is a cross section drawing of the distally extending outfeed compartment 6, showing plates making up the grid 24 in the slit between two separation panels 19. FIG. 7B shows a view from below into the opening of the slit 9. Where the grid 24 between the two separation panels 19 is demonstrated. Apart from just making a grid in the opening of the slit the plates making up the grid can be bent in different direction at the outfeed end to direct the airflow in different directions.

Figure 8:
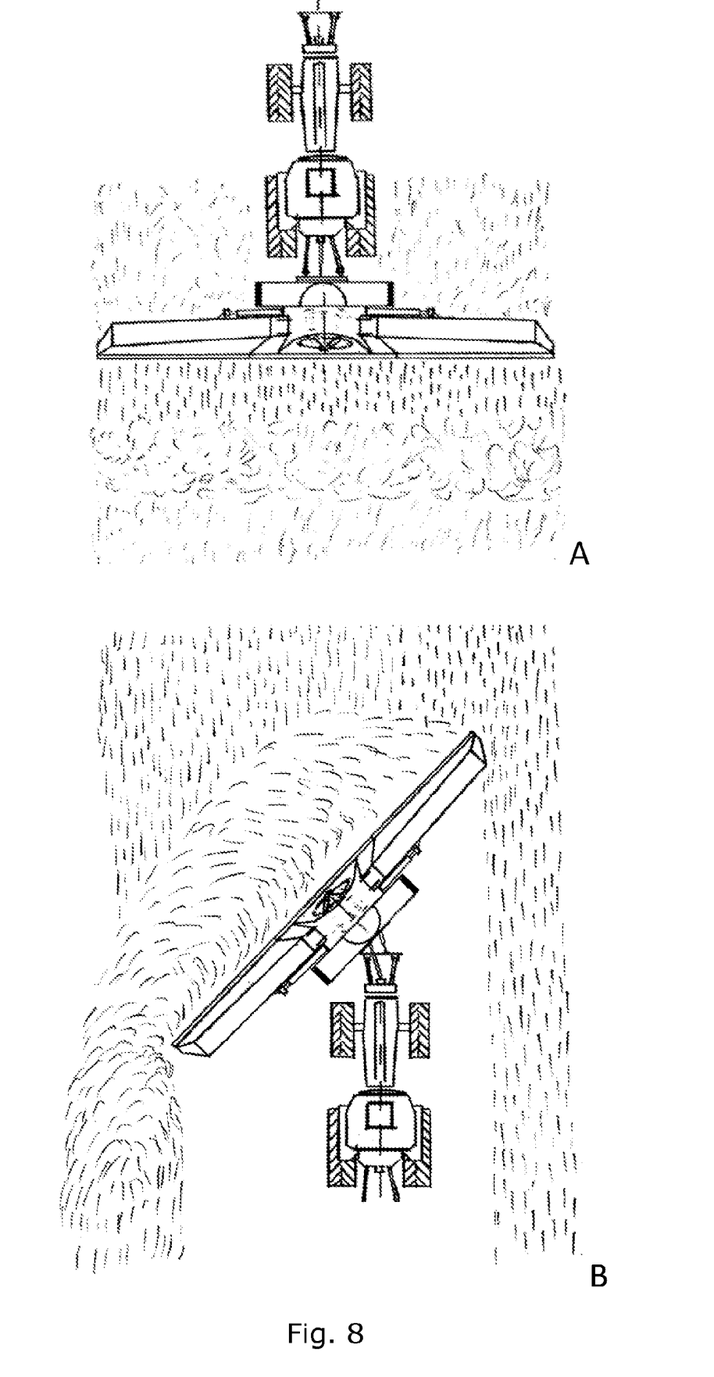
FIG. 8 shows a schematic drawing of two modes of operating the device of the hay tedding and windrowing device of the present invention.

FIG. 8 shows the use of the hay tedding and windrowing device for two different purposes. In FIG. 8A, the device is attached and connected to the aft part of a tractor for fluffing or tedding hay in order to facilitate drying of crops before harvesting. The drive means of the hay tedding device is connected to the power take-off shaft of the tractor, which drives the fan wheel of the device and blows air through the air outlets of the device tossing and turning the hay on the ground separating the straws lying on the ground facilitating faster drying. The attachment of the tractor to the chassis of the device through the connector beams allows for different position of the device with respect to the operating direction of the device. In FIG. 8A the operating position of the air outlet slit is perpendicular to the operation direction of the tractor, but this position can be altered when operating around fences or ditches. In FIG. 8B the device is attached and connected to the front part of a tractor for windrowing the hay to prepare the crops for harvesting. The drive means of the hay tedding device is connected to the power take-off shaft of the tractor in the same manner as in FIG. 8A, but the operating position of the device is a diagonal position with respect to the operation direction of the tractor.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

The invention claimed is:

1. A hay tedding and windrowing device for connecting to and operating with a tractive vehicle, comprising:
    a drive means (5),
    a housing, having:
        an air intake (3),
        a central wheel compartment (2), and
        one or more air outfeed compartments (6-7), and
    a fan wheel (4) within the central wheel compartment, connected to the drive means,
wherein the air outfeed compartment comprises an elongated chamber extending distally from the central wheel compartment, having one or more elongated downward facing air outlet slit (9) extending along the chamber.

2. The hay tedding and windrowing device according to claim 1, wherein the one or more air outfeed means (6-7) comprise at least one oppositely arranged outfeed compartment further comprising an elongated chamber having one or more elongated downward facing air outlet slits extending along the chamber.

3. The hay tedding and windrowing device according to claim 1, wherein the one or more elongated downward facing air outlet slits comprise a continuous slit extending along the length of the elongated outfeed compartments (6) and the central outfeed compartment (7).

4. The hay tedding and windrowing device according to claim 1, wherein one or more spoiler panels (8) are arranged inside the air outfeed means (6-7) to distribute airflow along the length of the elongated outfeed compartments (6) and the central outfeed compartment (7).

5. The hay tedding and windrowing device according to claim 1, further comprising a chassis for carrying the housing and fan wheel, the chassis comprising connector beams (1) for connecting to an attaching means of a tractive vehicle.

6. The hay tedding and windrowing device according to claim 1, wherein the fan wheel comprises fan blades.

7. The hay tedding and windrowing device according to claim 1, wherein the one or more elongated downward facing air outlet slits (9) is separated into multiple slits by one or more separation panels (19).

8. The hay tedding and windrowing device according to claim 1, wherein the one or more elongated downward facing air outlet slits (9) further comprises one or more adjustable spoiler panels (20) on hinges (21) in the bottom or lower or after part of the slit (9).

9. The hay tedding and windrowing device according to claim 1, wherein the one or more elongated downward facing air outlet slits (9) further comprises one or more air direction controllers (23).

10. The hay tedding and windrowing device according to claim 9, wherein the one or more air direction controllers (23) are positioned in the in the bottom part of the slit (9) or on the adjustable spoiler panel (20).

11. The hay tedding and windrowing device according to claim 1, wherein the drive means comprises an input shaft connectable to a power take-off shaft connected to an output shaft of a tractive vehicle.

12. The hay tedding and windrowing device according to claim 11, wherein the drive means further comprises a belt drive (12) connecting the input shaft to the fan wheel.

13. The hay tedding and windrowing device according to claim 1, wherein the elongated outfeed means and air outlets are arranged to blow air at an angle within the range from about 0 to 45° from vertical.

14. The hay tedding and windrowing device according to claim 1, wherein the elongated outfeed portion of the outfeed means extend substantially in a sideways direction from the central wheel compartment relative to the forward operating direction of the device and connected tractive vehicle.

15. The hay tedding and windrowing device according to claim 14, wherein the elongated outfeed means extend substantially in a sideways direction at an angle in the range from about 45° to about 90° relative to the forward operating direction of the device and connected tractive vehicle.

16. The hay tedding and windrowing device according to claim 1, wherein said elongated means are arranged with hinges (11) hydraulic cylinders (10), so that they can be raised from an operating position to a raised transport position, relative to the central wheel housing.

17. The hay tedding and windrowing device according to claim 1, having an operation width within the range from about 5 m to about 20 m.

18. A hay tedding and windrowing device for connecting to and operating with a tractive vehicle, comprising:
   a drive means (5),
   a housing, having:
      a central wheel compartment (2) with an air intake portion (3), and
      one or more air outfeed compartments (6-7), and
   one or more fan wheels (4) within the central wheel compartment, connected to the drive means,
wherein the one or more air outfeed compartments comprise a central outfeed compartment (7) and two elongated and oppositely arranged elongated outfeed compartments (6) extending distally from the central wheel compartment and the central outfeed compartment (7), and wherein the central outfeed compartment (7) and the distally extending elongated outfeed compartments (6) further comprise one or more elongated downward facing air outlet slits (9).

19. A method for tedding hay comprising:
   connecting to a tractive vehicle a device as defined in claim 1, by connecting the chassis of the device to attaching means of the tractive vehicle, and connecting drive means of the device to a power take-off shaft of the tractive vehicle,
   driving the tractive vehicle through cut grass and/or hay and outputting power to the power take-off shaft for turning the fan wheel in the device, such that air is sucked into the housing of the device and directed into elongated chambers and blown out through downward facing air outlet slits, wherein the hay is tedded.

20. A method for windrowing hay comprising:
   connecting a device as defined in claim 1, by connecting the chassis of the device to attaching means of the tractive vehicle, and connecting drive means of the device to a power take-off shaft of the tractive vehicle,
   extending one or more of the connector beams of the device so that an outfeed compartment with an elongated chamber extends in a diagonal position with respect to the operating direction of the tractive vehicle at an angle within the range from about 25° to about 65° with respect to the forward driving direction of the tractive vehicle,
   driving the tractive vehicle through a field with cut grass and/or hay and outputting power to the power take-off shaft for turning the fan wheel in the device, such that air is sucked into the housing of the device and directed into the sideways arranged elongated chambers and blown out through one or more downward facing air outlet slit, resulting in that the hay is arranged in a windrow.

21. The method of claim 20, wherein the device comprises two oppositely arranged outfeed compartment each comprising a respective elongated chamber.

* * * * *

UNITED STATES PATENT AND TRADEMARK OFFICE
CERTIFICATE OF CORRECTION

PATENT NO. : 11,154,012 B2  
APPLICATION NO. : 16/314533  
DATED : October 26, 2021  
INVENTOR(S) : Mikkaelsson et al.

Page 1 of 1

It is certified that error appears in the above-identified patent and that said Letters Patent is hereby corrected as shown below:

On the Title Page

Insert Item (30): Foreign Application Priority Data: --IS 050154 filed on July 01, 2016--

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*